Sept. 30, 1969 F. M. TRANTANELLA 3,470,542
MODULAR SYSTEM DESIGN
Filed March 17, 1967 5 Sheets-Sheet 1
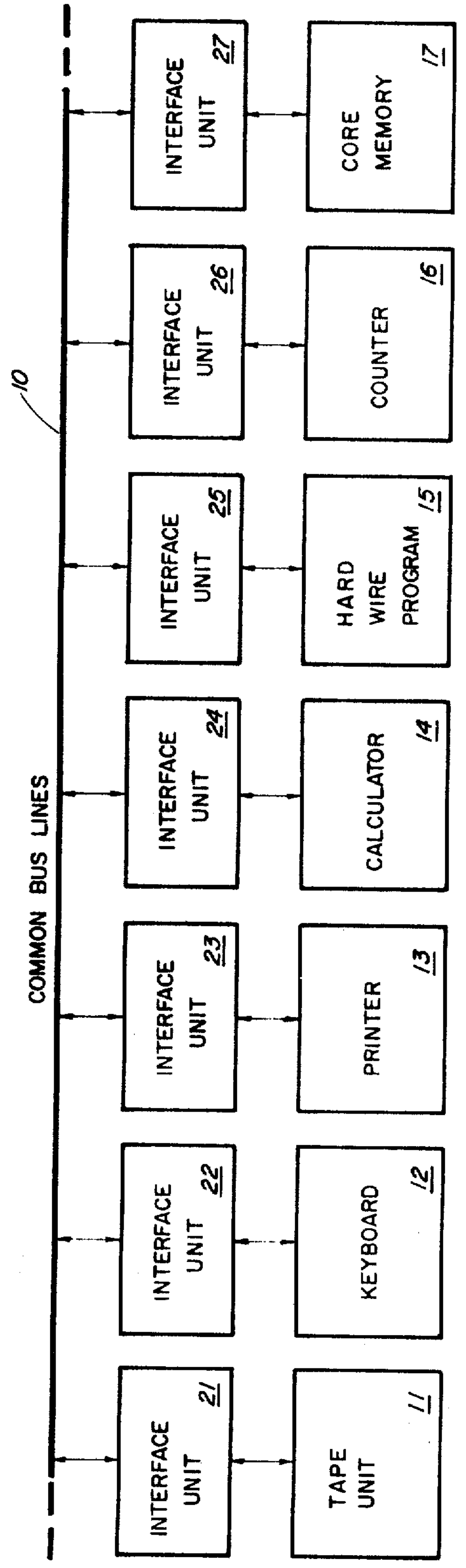
FIG I SYSTEM BLOCK DIAGRAM FIG 2 BUS AND STANDARD INTERFACE UNIT
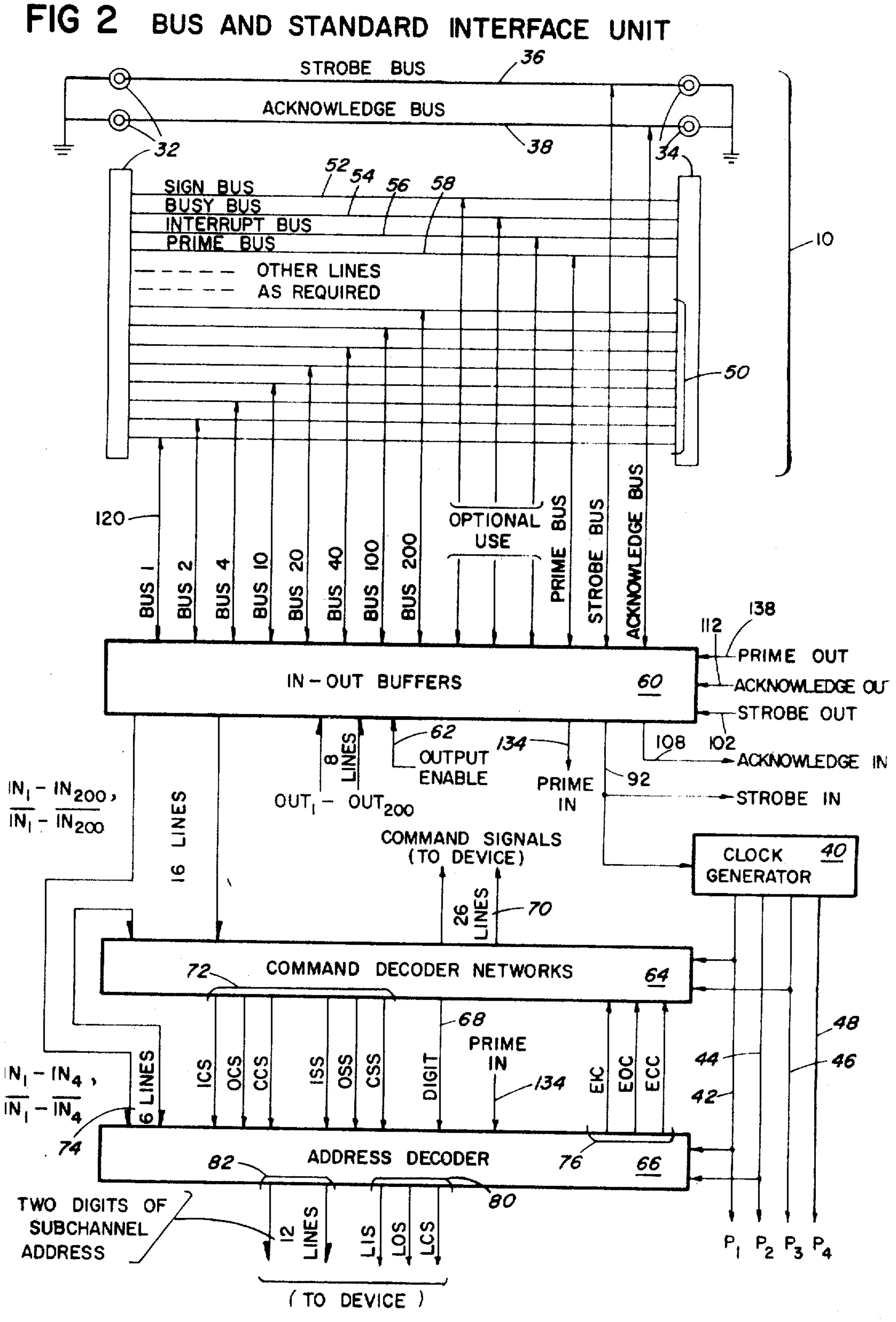

FIG 3 IN-OUT BUFFERS AND CLOCK GENERATOR
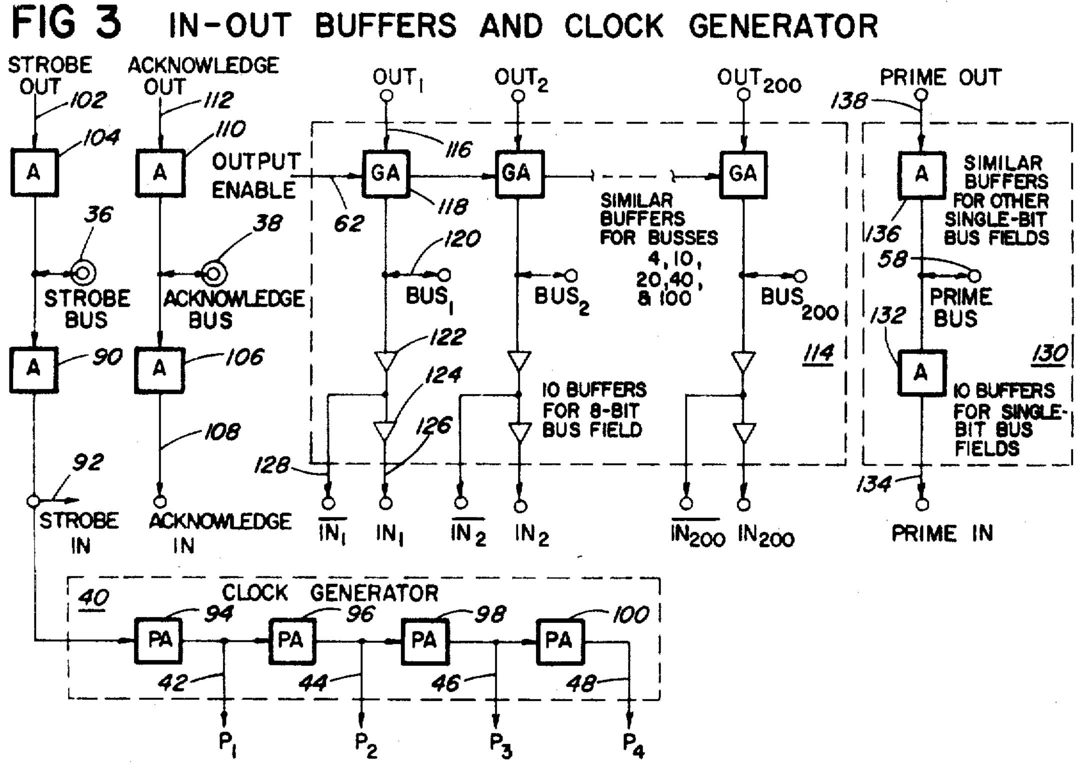
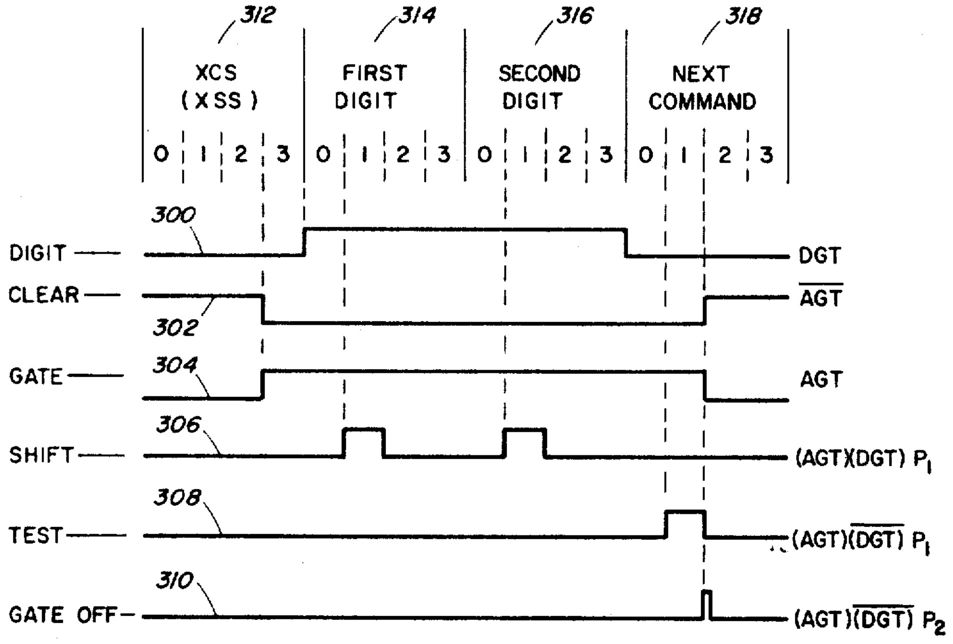
FIG 6 TIMING DIAGRAM

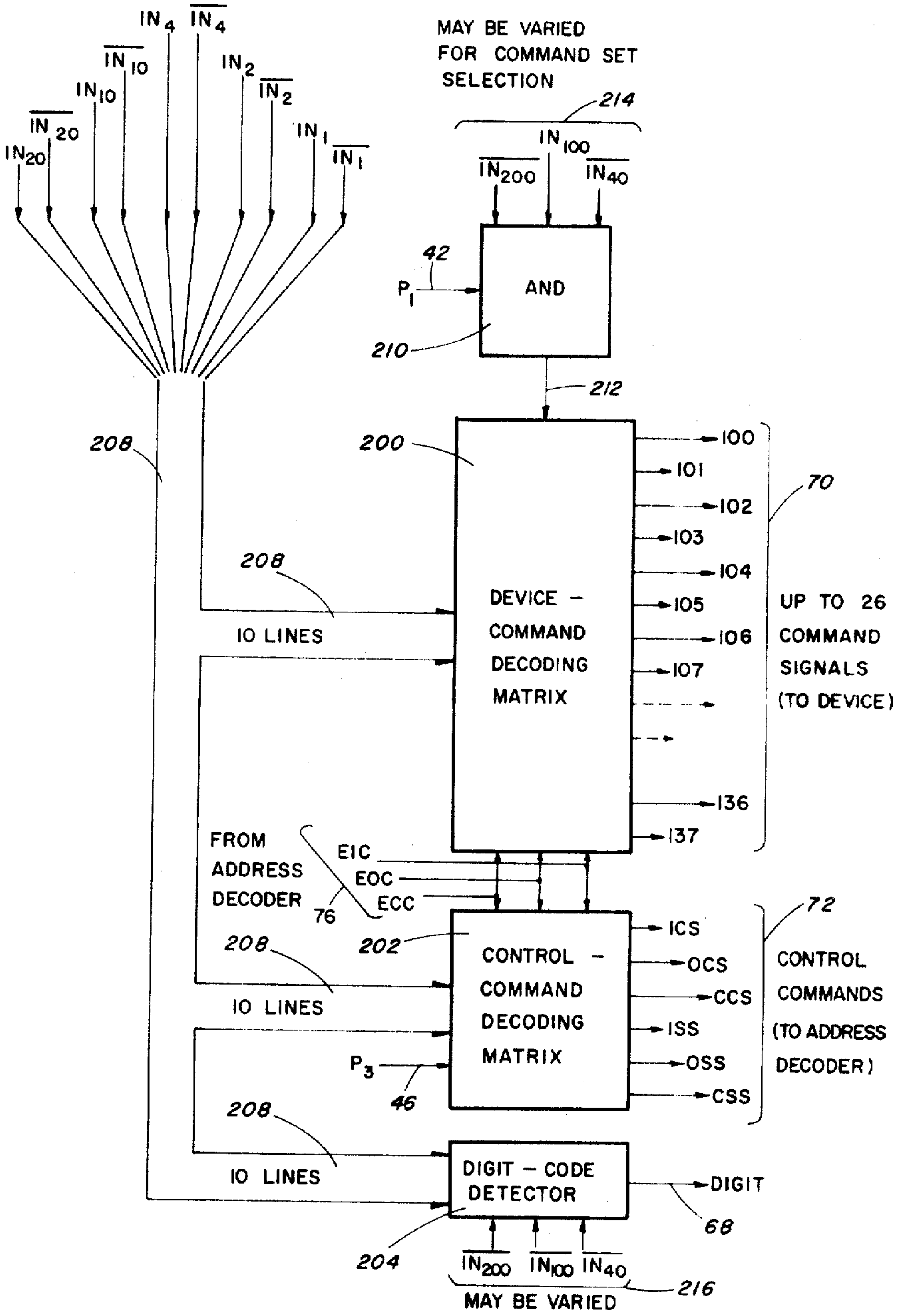
FIG 4 COMMAND DECODER NETWORKS

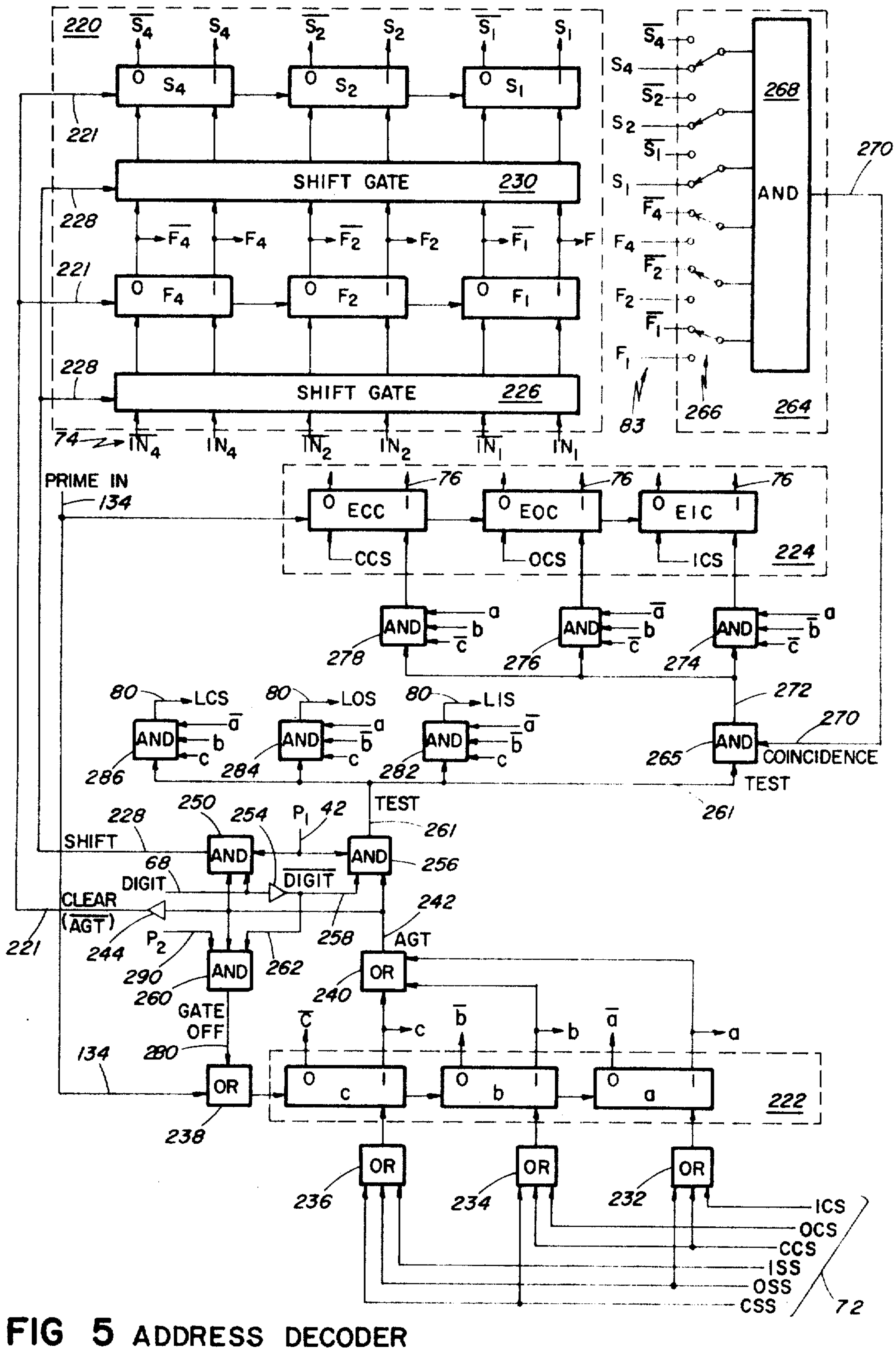
FIG 5 ADDRESS DECODER

United States Patent Office 3,470,542
Patented Sept. 30, 1969

3,470,542
MODULAR SYSTEM DESIGN

Frank M. Trantanella, Lexington, Mass., assignor to Wang Laboratories, Inc., Tewksbury, Mass., a corporation of Massachusetts Filed Mar. 17, 1967, Ser. No. 623,987
Int. Cl. G11b *31/00*
U.S. Cl. 340—173 7 Claims

ABSTRACT OF THE DISCLOSURE

Modular system design, a number of digital devices communicating with each other through a common bus capable of transmitting control information, addresses, and data. A standard interface unit is used in conjunction with each device intermediate between the device and the common bus. The interface unit includes command decoding networks, address comparison logic, and operating-role assignment logic thereby permitting the assignment of appropriate operating roles to addressed devices, and permitting selective response to bus control information depending upon the operating role assigned.

This invention relates to modular interconnection of digital systems.

Diverse system configurations are required for specific applications. Although standard component devices such as calculators, tape transports, core memories, counters, printers, etc. are often used in such systems, the particular set of component devices selected and the mode of interconnection required may vary widely from one system to another. Furthermore, it is often necessary to utilize a given component device in multiple operating modes. Heretofore, a common procedure for constructing systems with a number of component devices has been to custom-design unique interconnecting circuitry for each special system application. Particularly in the case of systems utilizing relatively inexpensive component devices the cost of designing and constructing special interconnecting circuitry frequently makes up a major portion of the total cost of the system. Appreciable savings in both design cost and construction cost can be effected by providing a standard modular form of interconnection that may be used with varied combinations of component devices.

It is the primary object of the present invention to provide versatile modular interconnection which can be used with a wide range of systems, which can be expanded readily to incorporate additional component devices without affecting the portions of the system first constructed, which permits the use of a standard interconnecting apparatus with any of a wide variety of component devices and which is readily programmable to permit each device to be addressed for a wide repertoire of commands in a variety of operating roles: input, output, and control. A further object of the invention is to provide such an interconnection which is relatively inexpensive to incorporate even in complex systems, which requires a minimum of hardware, and which permits convenient addressing not only of any given component device, but also of the various subdivisions of each device in the system.

The invention features a common bus containing a number of separate, parallel signal lines readily extensible to permit the addition of further component devices at any point on the common bus and a standard interface unit one of which is used in conjunction with each component device on the common bus intermediate between the device and the bus thereby permitting every device to communicate freely with every other device on the bus. In the preferred embodiment the interface unit includes buffer circuits to match the electrical characteristics of the common bus to those of the interface logic, command decoder networks, clock pulse generating circuitry, and an address decoder, the command decoding networks being capable of distinguishing command information from addresses and data, and being capable of generating appropriately sequenced command levels in response to such command information, and the address decoder including address storage, operating mode storage and address comparison logic so that it may store and assemble device addresses, may compare such addresses with the predetermined address of the associated device, may assign an appropriate operating role (input, output, or control) to that device when it is addressed, and may further assemble and store subchannel addresses which determine the particular subdivision or portion of the addressed device that is to respond to the command levels produced by the command decoding networks.

Other objects, features and advantages will appear from the following description of the preferred embodiment of the invention taken together with the attached drawings in which:

FIG. 1 is a simplified block diagram of an entire system incorporating the modular interconnection.

FIG. 2 is a block diagram of the common bus and one of the standard interface units.

FIG. 3 is a more detailed block diagram of the in-out buffers and clock generator.

FIG. 4 is a detailed block diagram of the command decoder networks.

FIG. 5 is a detailed logic diagram of the address decoder.

FIG. 6 is a timing drawing of a typical system operating cycle.

FIG. 1 is a block diagram showing a typical system configuration including seven component devices: a tape unit 11, a keyboard 12, a printer 13, a calculator 14, a hard wire program 15, a counter 16, and a core memory 17. All seven devices are connected in parallel to a common bus 10 composed of a number of parallel signal lines. Associated with each component device intermediate between each device and the bus are standard interface units 21, 22, 23, 24, 25, 26, and 27. The bus may carry either data or control information. Although the system as shown in FIG. 1 incorporates only seven component devices it need not be limited to seven devices. In the preferred embodiment described herein up to 64 separate devices can readily be interconnected in a single integrated system.

All of the devices communicate with each other through the bus lines 10. The communication may consist of either control instructions or data transmission. At any given time, one of the component devices will assume control of the entire system, and other component devices will be assigned roles as input or output devices. The roles of input, output, and control may be reassigned by special control instructions issued through the bus by the operator or program. Although certain devices may be specifically designed to perform only input or output functions, there is nothing in the modular interconnection design that would prevent any specific device from assuming a full range of roles.

Consider, for example, an extremely simple system consisting only of the bus 10, the counter 16, the printer 13, and the two associted interface units 26 and 23 respectively. In this system there would be no need for programming or for a control device. The counter could be permanently assigned as output and the printer could be permanently assigned as input. Data would always be transmitted out from counter 16 to the bus 10 (through interface unit 26) and from the bus 10 into the printer 13 (through interface unit 23).

Should this simple system be expanded to include tape unit 11, calculator 14, and core memory 17, a number of additional signal flow paths would be required. For instance, data originating in counter 16 first might be sent to core memory 17, then to calculator 14, next to tape unit 11, and finally to printer 13. Input and output roles would be required to change repeatedly during the operation of such a program. Yet more complex systems would require even greater flexibility of flow paths and role assignment. For example, a system with 64 component devices would have 4032 possible signal flow paths and 249,984 possible assignments of input, output, and control roles. Even for such complex systems the common bus used with the single standard form of interface unit provides full flexibility of communication paths and role assignment. One such interface unit used with each device permits every device to communicate freely through the bus with every other device on the bus as well as allowing convenient assignment of appropriate roles to various devices during the successive stages of program execution.

FIG. 2 is a more detailed block diagram showing a portion of the common bus 10 and one of the standard interface units. The bus portion associated with a given interface unit extends between two sets of standard connectors (here identified as 32 and 34 respectively). This modular arrangement permits additional units to be conveniently added to the bus at any point.

Two coaxial bus lines 36 and 38 are reserved for transmitting special control pulses designated respectively the STROBE pulse and the ACKNOWLEDGE pulse. The STROBE pulse is applied to the bus by an output device to indicate that information has been placed on the bus and is ready for sampling. The ACKNOWLEDGE pulse is applied to the bus by an input device to indicate that the information on the bus has been received and, if necessary, stored, and that further information may be placed on the bus. The STROBE triggers clock generator 40, causing it to produce a sequenced train of clock pulses P1, P2, P3, and P4, which are successively applied to lines 42, 44, 46, and 48 respectively. The clock pulses are used to control time sequenced operations of the interface unit in a manner to be further described below.

In the preferred embodiment short pulse signals are used only on the STROBE and ACKNOWLEDGE bus lines; the remaining bus lines carry signal levels of longer duration and therefore need not be coaxial cables. Eight bus lines generally designated 50 make up an eight-bit field used for transmitting control information, octal address digits, and data.

The remaining bus lines are used as single-bit control fields. Four such single-bit lines are shown in FIG. 2 but spare lines may be provided to accommodate additional control signals which new devices may require. The SIGN bus 52 is used to carry the sign bit of numerical data; this bus facilitates the use of sign tests as programming controls. The BUSY bus 54 carries a BUSY signal which is used to indicate that a given addressed device is currently in use. The INTERRUPT bus 56 carries an INTERRUPT signal which requests an addressed device to interrupt its current operation. The PRIME bus 58 carries the PRIME signal which may be used to clear all devices on the bus. The signals described above are arbitrary. Other signals and signal modes can be utilized with equal facility. Similarly, the number of bus lines shown is arbitrary. A greater or fewer number of lines may be desirable depending upon the nature and complexity of the devices that are to be interconnected on the bus.

The in-out buffers 60 contain amplifiers for matching the interface logic levels to the electrical characteristics of the bus, inverters for producing the logical complements of incoming signals from the bus, and gate circuits for gating outgoing signals onto the bus in response to the OUTPUT ENABLE signal on line 62.

The command decoding networks 64 decode incoming information from the bus and determine whether the information is control information or numerical data. If data is present, a DIGIT signal is applied to address decoder 66 over line 68. If control information is present, appropriate command signals are generated at appropriate times (clock lines 42 and 46 carry the P1 and P3 clock pulses into the command decoder networks). Most of the command signals are applied directly to the associated device via lines 70, but six specialized control commands are instead applied to the address decoder 66 on lines 72. These six signals control the mode of operation of the interface unit and its associated device by conditioning the state of the address decoder.

The address decoder receives addresses from the bus sequentially on lines 74, one octal digit at a time, receives control information from the command decoder networks on lines 72, and receives P1 and P2 clock pulses from the clock generator on lines 42 and 44. The primary function of the address decoder is to assemble and store incoming addresses, to compare them with the preassigned address of the specific device associated with the interface unit, and if the comparison indicates correspondence (i.e., that the associated unit is indeed the unit that is being addressed), to assign the addressed device an appropriate operating role (input, output, or control).

Once the address decoder has been conditioned by the correct address and by one of the three role-assignment control commands: ICS (Input Command Slect), OCS (Output Command Select), or CCS (Control Command Select) it returns one of three internal control signals to the command decoder networks on lines 76. These three internal control signals are EIC (Enable Input Commands), EOC (Enable Output Commands), and ECC (Enable Control Commands); these signals serve to condition the response of the command decoder networks to subsequently received bus information in accordance with the current operating role of the device.

Further address data may then be sent into the address decoder to specify a subchannel address (i.e., the address of one of the subdivisions of the addressed device). The subchannel address data is always preceded by one of the three subchannel-assignment control commands: ISS (Input Subchannel Select), OSS (Ouptput Subchannel Select), or CSS (Control Subchannel Select). The subchannel address is assembled and temporarily stored by the address decoder, and then advanced into the addressed device. The address decoder applies one of three subchannel control signals to the device on lines 80: LIS (Load Input Subchannel), LOS (Load Output Subchannel), or LCS (Load Control Subchannel). These three signals determine how the device is to use the subchannel address then sent to it over lines 82.

FIG. 3 shows the details of the in-out buffers and the clock generator. The coaxial STROBE bus 36 applies an incoming STROBE pulse to amplifier 90. The output of amplifier 90 is the STROBE in pulse at line 92. This pulse triggers the first pulse amplifier 94 of clock generator 40. The output of pulse amplifier 94 is the P1 clock pulse which appears on line 42. The P1 clock pulse in turn triggers pulse amplifier 96 producing the P2 clock pulse at line 44. The P2 clock pulse next triggers pulse amplifier 98 producing the P3 clock pulse on line 46. The P3 clock pulse finally triggers pulse amplifier 100 producing the P4 clock pulse at line 48. In the preferred embodiment the P clock pulses are spaced about ten microseconds apart. Thus each incoming STROBE pulse generates a timed sequence of four equally spaced P clock pulses P1 through P4.

When a device functioning in an output role has placed a frame of output information on the bus, it generates a STROBE out pulse which is applied to line 102. Amplifier 104 matches this output pulse to the electrical characteristics of the coaxial STROBE bus 36. The resulting STROBE pulse is transmitted through the STROBE bus to all devices, notifying the device that is currently operating in an input role that data has been placed on the bus and is ready for sampling.

The coaxial ACKNOWLEDGE bus 38 functions in much the same manner. An incoming ACKNOWLEDGE pulse is applied to amplifier 106. The output of amplifier 106 is made available to the device at line 108. If the device is operating in an input role it generates an ACKNOWLEDGE out pulse when it has finished accepting information from the bus and applies this pulse to amplifier 110 through line 112. Amplifier 110 matches this output pulse to the electrical characteristics of the coaxial ACKNOWLEDGE bus 38. The resulting ACKNOWLEDGE pulse is transmitted through the ACKNOWLEDGE bus to all devices, notifying the device that is currently operating in an output role that the information has been taken from the bus and that new information may be applied to the bus.

The in-out buffers for the eight-bit bus field 50 are shown at 114. Each of these in-out buffers is identical. When the OUTPUT ENABLE gate is asserted at line 62 and an $OUT_1$ signal is applied to line 116, gated amplifier 118 applies an output signal to bus 1 through line 120. When an input signal is received from bus 1, the signal is applied through line 120 to two series-connected inverters, 122 and 124. The incoming signal itself appears in uncomplemented form at line 126 and is there designated $IN_1$. The logical complement of the incoming signal appears at line 128, and is there designated $\overline{IN}_1$. The eight-bit bus field buffered by the circuits shown at 114 is usually coded in octal; thus the least significant of the eight lines usually has weight 1 (octal), and the most significant line has weight 200 (octal).

The single-bit command field input-output buffers at 130 function in essentially the same manner except that the incoming signals are not complemented and the output buffers are not gated. The PRIME bus 58 applies an incoming PRIME signal to amplifier 132. The output of amplifier 132 is received by the device at line 134 as the PRIME in signal. When a device generates a PRIME out signal, the signal is applied to amplifier 136 through line 138. Amplifier 136 matches the signal to the electrical characteristics of the bus. A given system may incorporate as many additional single-bit command field input-output buffers as required; each of them functions in the same manner as the PRIME buffer described above.

A block diagram of the command decoder networks is shown in FIG. 4. The command decoder networks are made up of three principal sections: (1) the device-command decoding martix 200, which decodes the 26 command codes normally available for generating command signals to be sent to the associated device; (2) the control-command decoding matrix 202, which decodes the six basic internal control commands that are applied to the address decoder 66; and (3) the digit-code detector 206 which senses those codes corresponding to numerical digits. In the preferred embodiment all three of these sections utilize conventional diode matrices.

The primary input to the command decoding networks is the eight-bit bus field 50. The five least significant bits of the eight-bit field ($IN_1$ through $IN_{20}$) are applied to the command decoding networks of every interface unit in the system in both normal and complemented form as shown at 208. These five bits can carry $2^5=32$ separate and distinct binary codes. Of these 32 codes, six are used to produce the control commands 72 that are sent to the address decoder 66; the remaining 26 command codes are available for generating up to 26 command signals 70 that are applied to the associated device when appropriate conditions are met.

The device-command decoding matrix 200 is enabled only when AND gate 210 generates an output signal on line 212. This can occur only at P1 time when a P1 clock pulse is applied to the AND gate at line 42. The three most significant bits of the eight-bit bus field ($IN_{40}$, $IN_{100}$, and $IN_{200}$) may be applied to AND gate 210 in various configurations for the various devices used in the system as shown at 214. This permits assigning up to eight different sets of command codes to different sets of devices and thereby allows greater flexibility of programming than would be available if all devices were to use the same command sets.

Three additional gating signals are applied to the device-command decoding matrix as shown at 76. These are the EIC (Enable Input Command), EOC (Enable Output Command), and ECC (Enable Control Command) internal control signals from the address decoder 66. These three signals can serve as a mask for the command set by being ANDed with specific subsets of command signals. It may, for example, be desirable to ensure that only certain commands may be used when the associated device is assigned as an input device, as an output device, or as a control device.

The five least significant bits 208 of the eight-bit bus field 50 are also applied to the control-command decoding matrix 202, as are the EIC, EOC, and ECC internal control signals 76. The control-command decoding matrix is enabled only at P3 time when a P3 clock pulse is applied to line 46. At that time the control-command decoding matrix may generate any of six control commands which are then applied to the address decoder on lines 72. The three basic role-assignment control commands are ICS (Input Command Select), OCS (Out Command Select), and CCS (Control Command Select). If the associated device is currently addressed, these three commands assign an operating role to the device (input, output, or control, respectively). The three role-assignment control commands are not gated by the EIC, EOC, and ECC internal control signals on lines 76. These three commands are, on the contrary, used to designate the current operating role of the associated device (input, output, or control as the case may be) and thus to determine whether or not any of the three internal control signals EIC, EOC, or ECC are to be returned to the command decoder networks.

The remaining three control commands generated by the control-command decoding matrix, ISS, OSS, and CSS, are, however, conditioned by the EIC, EOC, and ECC internal control signals from the address decoders. These three subchannel-assignment control commands are used for subchannel addressing; one of them must always precede the sending of a subchannel address to the interface unit. The function of these three subchannel-assignment control commands is to determine the manner in which the associated device is to use the subchannel address. The ISS (Input Subchannel Select) command can be sent to the address decoder only when the associated device has already been assigned an input role; in that event an EIC (Enable Input Command) internal control signal is applied to the command decoder networks from the address decoder. In the control-command decoding matrix 202 the EIC level is ANDed with the appropriate ISS command code from lines 208 to cause the control-command decoding matrix to produce an ISS subchannel-assignment control command. The ISS control command is then applied to the address decoder where it results in the generation of an LIS (Load Input Subchannel) subchannel control signal which is in turn applied to the associated device to ensure that the device will use the subchannel address to select the correct input subchannel (rather than an output or control subchannel). Similarly, the OSS (Output Subchannel Select) command can be sent to the address decoder only when the associated device has been assigned an output role, and the CSS (Control Subchannel Select) command can be sent to the address decoder only when the device has been assigned a control role. These two subchannel-assignment control commands are enabled by the EOC (Enable Output Command) and ECC (Enable Control Command) internal control signals respectively. They result in the address decoder applying an LOS (Load Output Subchannel) or an LCS (Load Control Subchannel) subchannel control signal to the device, thereby ensuring that the device will use the subchannel address to select the correct output or control subchannel respectively.

The digit-code detector 204 is used to distinguish addresses and other numerical data from control information. A specific consecutive field of binary codes is ordinarily used for numerical data. The three most significant bits of the eight-bit bus field 50 ($IN_{40}$, $IN_{100}$, and $IN_{200}$) ordinarily remain constant for all of the numerical codes. Consequently, a fixed configuration of these three bits is applied to the digit-code detector as shown at 216. The specific configuration chosen will, of course, depend upon the particular code field selected for numerical data. The connections shown at 216 include the complements of the three most significant bits, thus implying that numerical data will always be confined to codes below 40 (octal). The remaining five bits 208 of the eight-bit bus field may be used as required as inputs to the digit-code detector, the diode logic being so arranged as to cause the detector to apply a DIGIT signal to the address decoder on line 68 only when the incoming code on lines 208 corresponds to one of the numerical digits.

A detailed logic drawing of the address decoder 66 is shown in FIG. 5. The operation of the address decoder may be most readily understood if concurrent references are made to FIG. 5 and to FIG. 6, the system timing diagram.

The address decoder contains a two-digit octal shift register 220 for assembling and storing device and subchannel addresses, a three-bit command-storage register 222 for storing incoming control commands from control-command decoding matrix 202, and three single-bit flip-flop registers 224 for storing the operating role assignment (input, output, or control) of the addressed device.

Device addresses as well as subchannel addresses are loaded serially, one three-bit octal digit at a time. Initially, both stages of the address shift register are cleared by a CLEAR signal on line 221. Then the first (most significant) octal digit of the address is applied to input shift gate 226 over the three least significant lines of the eight-bit bus field 50 ($IN_1$, $IN_2$, and $IN_4$). Normal and complemented states of these three bits are applied over lines 74 to the six inputs of shift gate 226. The application of a SHIFT pulse to line 228 then causes the first (most significant) address digit to be loaded into the first stage of the address shift register (flip-flops $F_1$, $F_2$, and $F_4$). The second (least significant) address digit is then applied to shift gate 226 through lines 74. Another SHIFT pulse is applied to line 228. This second SHIFT pulse causes shift gate 230 to advance the first address digit (the contents of $F_1$, $F_2$, and $F_4$) into $S_1$, $S_2$, and $S_4$ respectively and at the same time causes shift gate 226 to load the second address digit into $F_1$, $F_2$, and $F_4$.

The three-bit command-storage register 222 is set up by the application of any one of the six control commands (ICS, OCS, CCS, ISS, OSS, and CSS) to lines 72. These six lines provide inputs to OR gates 232, 234, and 236. The inputs are arranged in such a configuration that each of the six control commands results in a specific unique coding of the three flip-flops (*a*, *b*, and *c*) making up the command-storage register 222. These codings are listed with the corresponding control commands in Table I below.

TABLE I.—COMMAND-STORAGE REGISTER CODING

| Command | c | b | a |
|---|---|---|---|
| None | 0 | 0 | 0 |
| ICS | 0 | 0 | 1 |
| OCS | 0 | 1 | 0 |
| CCS | 0 | 1 | 1 |
| ISS | 1 | 0 | 0 |
| OSS | 1 | 0 | 1 |
| CSS | 1 | 1 | 0 |
| (Spare code) | 1 | 1 | 1 |

When the system is first turned on a PRIME signal is applied to the PRIME bus 58, resulting in the generation of a PRIME in signal on line 134 from the in-out buffers 60. The PRIME in signal is applied to OR gate 238, thereby clearing the command-storage register 222. The PRIME in signal also clears the three operating-role assignment flip-flops 224. These operations occur in all interface units on the bus. When the command-storage register 222 contains 000, the three inputs to OR gate 240 are all zero, and the address gate AGT signal on line 242 is not asserted. Inverter 244 then causes the CLEAR signal ($\overline{AGT}$) to be asserted on line 221, thereby clearing both digits of the address shift register 220. The CLEAR signal continues to be asserted until the P3 clock pulse of the first control command (see FIG. 6 at 302).

Typically the system operating cycle is started with a role-assignment control command ICS (Input Command Select), OCS (Output Command Select), or CCS (Control Command Select) as shown in FIG. 6 at 312. The command code is placed on the eight-bit bus field 50, and then a STROBE pulse is applied to the STROBE bus 36, thus starting clock generator 40. The resulting P3 clock pulse at line 46 causes the control-command decoding matrix (see FIG. 4 at 202) to send one of the three role-assignment control commands ICS, OCS, or CCS to the address decoder on lines 72. The incoming control command signal clears the corresponding role-assignment flip-flops 224 of all interface units on the bus (ICS clears all EIC flip-flops, OCS all EOC flip-flops, and CCS all ECC flip-flops) and sets up appropriate bits of the command-storage register 222 as indicated by Table I. The setting of any bit of the command-storage register results in the assertion of the address gate AGT at line 242 (the output of OR gate 240), and also results in the termination of the CLEAR signal at line 221, thus freeing the address shift register 220 to receive an address. As can be seen in FIG. 6 at 304 and 302, the AGT signal comes on and the CLEAR signal terminates at the same time the P3 clock pulse gates the role assignment command out from the control-command decoding matrix to the command-storage register in the address decoder.

The next code to be applied to the eight-bit bus field 50 is typically the first (most significant) digit of the device address. This code is applied to the three low order bits of the bus ($IN_1$, $IN_2$, and $IN_4$). The STROBE pulse that follows this address digit again triggers clock generator 40, thereby starting another P clock cycle (shown in FIG. 6 at 314). The digit-code detector senses that the address digit is indeed a numerical digit code and generates a DIGIT signal on line 68. Since the AGT address gate signal is still asserted at line 242, AND gate 250 is enabled by the DIGIT signal. The P1 clock pulse initiated by the STROBE pulse of the first address digit causes AND gate 250 to generate a SHIFT pulse on line 228 (shown in FIG. 6 at 306). This SHIFT pulse applied to input shift gate 226 clocks the first address digit into the first stage of the address shift register 220.

The second (least significant) digit of the device address is then applied to the three least significant lines of the eight-bit bus field 50. The STROBE pulse following this code starts another P clock cycle (shown in FIG. 6 at 316). The P1 clock pulse again causes AND gate 250 to generate another SHIFT pulse (shown in FIG. 6 at 306). This second SHIFT pulse causes shift gate 226 to clock the second (least significant) address digit into the first stage of the address shift register 220 ($F_1$, $F_2$, and $F_4$) and also causes shift gate 230 to advance the first address digit into the second stage of the shift register ($S_1$, $S_2$, and $S_4$). As soon as the address code is removed from the bus, the DIGIT signal ends on line 68. This causes inverter 254 to assert the $\overline{DIGIT}$ signal and to apply it to AND gate 256 on line 258 and to AND gate 260 on line 262 (FIG. 6 at 300).

The next command code to be applied to the bus is followed by a STROBE pulse which initiates the P clock cycle shown in FIG. 6 at 318. Because AND gate 256 is enabled by the $\overline{\text{DIGIT}}$ signal on line 258 and by the address gate AGT on line 242, the P1 clock applied to AND gate 256 at line 42, causes AND gate 256 to produce a TEST pulse at line 261 (shown in FIG. 6 at 308). This TEST pulse initiates an address comparison test. On the lines 83, both the normal and complemented outputs of the address shift register 220 are applied to the address comparison circuit 264. The address comparison circuit consists of six two-position switches 266 and an AND gate 268. The six switches are set to positions corresponding to a two-digit octal address code (as shown in FIG. 5, the switches specify the address 70 (octal)). If the contents of the address shift register match the settings of the address comparison circuit switches, then AND gate 268 produces a COINCIDENCE signal output at line 270. The COINCIDENCE signal indicates that the address that has been assembled and stored in the address shift register 220 is indeed the correct address of the associated device. The address comparison circuit utilizes a switch-set device address, rather than a permanently wired address in order to facilitate any reassignment of device addresses that may be required by the programmer when the system is expanded by the addition of new devices or is otherwise modified.)

Note that the TEST signal is generated on line 261 of *every* interface unit on the bus. The COINCIDENCE signal, however, is asserted only at the *single* interface unit that has been addressed. At that addressed unit, and that unit *only*, AND gate 265 produces an output on line 272, thus causing AND gates 274, 276, and 278 to sample the contents of the command storage register 222. If the preceding role-assignment control command was an ICS (Input Command Select) its arrival at the address decoders of the various interface units on the bus cleared all EIC role-assignment flip-flops, and set all command-storage registers to the 001 state.

The TEST pulse on line 261 (shown in FIG. 6 at 308) passes AND gate 265 of the addressed interface unit only, appears on line 272 of that unit, and causes AND gate 274 (which is gated by the 001 contents of the command storage register) to set the EIC role-assignment flip-flop of the addressed interface unit. The internal control signal EIC (Enable Input Commands) is then returned to the command decoder networks 64. The input role is thus assigned to the device associated with the addressed interface unit for all succeeding operations until the next ICS command (which would again clear the system of input-role assignments by clearing all EIC flip-flops in the system).

Similarly, if the preceding role-assignment control command was an OCS (Output Command Select), its arrival at the address decoders would clear all EOC role- assignment flip-flops and would set all command-storage registers to the 010 state. The TEST pulse would then cause AND gate 276 to set the EOC role-assignment flip-flop of the addressed interface unit. The internal control signal EOC (Enable Output Commands) would then be returned to the command decoder networks 64, thus assigning the output role to the device associated with the addressed interface unit for all succeeding operations until the next OCS command. Finally, if the preceding role-assignment control command were CCS (Control Command Select), it would clear all ECC flip-flops and would set all command-storage registers to the 011 state. The TEST pulse would then cause AND gate 278 to set the ECC role-assignment flip-flop of the addressed interface unit, thus returning an ECC internal control signal (Enable Control Commands) to the command decoder networks and assigning the control role to the addressed device until the next CCS command. In this manner, the input, output, and control operating roles may be readily reassigned to any device on the bus. The P2 clock immediately following the TEST pulse is applied to AND gate 260 on line 290. Since AGT and $\overline{\text{DIGIT}}$ are both asserted, the gate is enabled, and at P2 time it generates a GATE OFF signal on line 280, clearing the command-storage register through OR gate 238. (See FIG. 6 at 310.) The clearing of the command-storage register ends the address gate AGT and thus initiates the CLEAR signal (FIG. 6 at 304 and 302) which in turn clears the address shift register 220.

After operating roles have been assigned to the selected devices, the three subchannel-assignment control commands ISS (Input Subchannel Select), OSS (Output Subchannel Select), and CSS (Control Subchannel Select) may be used to assign subchannel addresses to any of the devices that have previously been assigned operating roles. The three subchannel-assignment control commands function in much the same manner as three role-assignment control commands previously discussed. The major difference is that there is no requirement for address comparison (because the role-assignments have already been made prior to the use of the subchannel-assignment control commands).

An ISS, OSS, or CSS command code is applied to the bus as shown in FIG. 6 at 312 (second line "XSS"). As in the previously described role-assignment commands (ICS, OCS, and CCS) this subchannel-assignment command at P3 time sets up the command-storage registers of all interface units on the bus to the appropriate code (shown in Table I, above). The next two codes applied to the bus load the address shift register with the two-digit octal subchannel address as shown in FIG. 6 at 314 and 316. At the next command, however, no address comparison test need be made. The TEST signal at line 261 (FIG. 6 at 318) samples the contents of the command-storage register 222 at AND gates 282, 284, and 286. The subchannel control signals LIS (Load Input Subchannel), LOS (Load Output Subchannel), and LCS (Load Control Subchannel) at lines 80 designate the appropriate use of the subchannel address which is applied to the associated device on lines 82. The LIS signal causes the device to treat the contents of the address shift register 220 as an input subchannel address; the LOS signal causes the device to treat the address shift register contents as an output subchannel address, and the LCS signal causes the device to treat the address as a control subchannel address.

Only the interface unit currently operating in an input role returns an EIC internal control signal to the control-command decoding matrix 202; consequently only that unit can generate an ISS subchannel-assignment control command and an LIS subchannel control signal. Similarly, only the output-role interface unit returns an EOC internal control signal and only that unit can generate an OSS subchannel-assignment control command and an LOS subchannel control signal. The control-role interface unit is the only unit returning an ECC internal control signal, and hence the only unit that can generate a CSS subchannel assignment control command and an LCS subchannel control signal.

Other embodiments will occur to those skilled in the art and are within the following claims.

What is claimed is:

1. An interconnecting system for a plurality of digital devices whereby each of said devices may communicate freely with every other such device comprising

- a common signal bus containing a plurality of separate parallel signal lines adapted for the transmission of control information, addresses, and other data,
- a plurality of identical interface units each of which is electrically connected to each of said signal lines, and each of which is electrically connected to one of said devices by a plurality of other signal lines
- each of said interface units comprising
  - a source of clock pulses
  - means of discriminating between control information and addresses or other numerical data received from said common bus
  - command decoding networks responsive to said clock pulses, to control information received from said common signal bus, and to internal control levels indicative of the current operating role of the device associated with said interface unit, said command decoding networks being adapted to generate a plurality of command signals dependent upon said clock pulses, said control information, and said internal control levels.

a first storage means responsive to certain of said command signals and capable of storing said command signals in coded form a second storage means for permanently storing the preassigned numerical address of the device associated with said interface unit a third storage means for storing addresses received from said common bus a comparison circuit adapted to compare the device address in said second fixed storage means with the addresses that are stored in said third storage means and adapted to produce a coincidence signal indicative of correspondence between said addresses when the device associated with said interface unit is addressed by address data transmitted over said common bus and stored in said third storage means a fourth storage means responsive to said coincidence signal and to the contents of said first storage means and thus adapted to store the operating role assigned to said addressed device by certain of said command signals and capable of producing internal control levels indicative of the contents of said fourth storage means and thus indicative of the current operating role assignment of said addressed device means of applying said control levels to said command decoding networks whereby the command signals subsequently generated by said command decoding networks and applied to said associated device are limited to the specific subset of command levels appropriate to the currently assigned operating role of said associated device.

2. The interconnecting system of claim 1 in which said third storage means comprises a shift register adapted to received addresses transmitted serially over said common bus, one digit at a time.

3. The interconnecting system of claim 1 in which the operating role assignments stored in said fourth storage means comprise input, output, and control role-assignments, and the internal control levels indicative of said role assignments are logically combined with the other inputs to said command decoding networks to produce three subsets of command signals such that the first such subsets contains those commands required to be used when the associated device is operating as an input device (i.e., is receiving input information from said common bus), the second such subset contains those commands required to be used when the associated device is operating as an output device (i.e. is applying output information to said common bus), and the third such subset contains those commands required to be used when the associated device is operating as a control device (i.e., is the specific device currently controlling the operation of the system and the devices interconnected by the interconnecting system).

4. The interconnecting system of claim 1 in which said second fixed storage means comprises a plurality of switches.

5. The interconnecting system of claim 1 in which a certain subset of command signals stored in said first storage means is applied to said associated device to cause said associated device to sample the contents of said third storage means and to use said contents to specify the address of a particular subdivision of said associated device.

6. The interconnecting system of claim 1 in which said common bus is composed of a plurality of segments, each of such said segments being connected between two standard electrical connectors one of which is male, and one female, and one of said bus segments is electrically interconnected to each of said interface units, whereby additional units and devices may be added to the system at any point on said common bus.

7. The interconnecting system of claim 1 in which said source of clock pulses is responsive to a control signal applied to said interface units through said common bus.

References Cited

UNITED STATES PATENTS

| | | | |
|---|---|---|---|
| 2,995,411 | 8/1961 | Morris | 340—173 |
| 2,997,693 | 8/1961 | Deerhake | 340—173 |

TERRELL W. FEARS, Primary Examiner

U.S. Cl. X.R.

340—150, 172.5